(12) United States Patent
Hashimoto

(10) Patent No.: US 7,646,466 B2
(45) Date of Patent: Jan. 12, 2010

(54) LIQUID CRYSTAL DISPLAY DEVICE

(75) Inventor: Shinya Hashimoto, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 166 days.

(21) Appl. No.: 11/892,377

(22) Filed: Aug. 22, 2007

(65) Prior Publication Data

US 2008/0088765 A1    Apr. 17, 2008

(30) Foreign Application Priority Data

Sep. 14, 2006   (JP) .............................. 2006-249009

(51) Int. Cl.
G02F 1/333     (2006.01)

(52) U.S. Cl. .......................... 349/158; 349/58; 349/150; 349/151

(58) Field of Classification Search .................... 349/58, 349/149, 150, 158, 160; 345/206; 361/681, 361/679.21
See application file for complete search history.

(56) References Cited

U.S. PATENT DOCUMENTS

2005/0036335 A1* 2/2005 Ohtomo et al. ............. 362/559
2007/0030433 A1* 2/2007 Kudo et al. ................. 349/149
2007/0091242 A1* 4/2007 Oohira ....................... 349/149
2008/0094561 A1* 4/2008 Fan et al. .................... 349/151

FOREIGN PATENT DOCUMENTS

JP      2001-42303     8/1999
JP      2004-101741    9/2002

* cited by examiner

*Primary Examiner*—Dung Nguyen
*Assistant Examiner*—Tai Duong
(74) *Attorney, Agent, or Firm*—Stites & Harbison PLLC; Juan Carlos A. Marquez, Esq.

(57) ABSTRACT

The liquid crystal display (LCD) device of the present invention includes a LCD panel and a resin-molded frame that houses the LCD panel, the LCD panel including first and second substrates, and a liquid crystal layer sandwiched between the first and second substrates. The two-dimensional shapes of the first and second substrates are rectangles having longer and shorter sides, the longer side of the first substrate being longer than that of the second substrate. The first substrate has a non-overlapping area that does not overlap with the second substrate. Among the four corners of the first substrate, the non-overlapping area of the first substrate has two corners adjacent to each other. At least one of the two corners forms a chamfered structure having a diagonal side that intersects the longer and shorter sides of the first substrate with the diagonal side inclined to the longer and shorter sides.

8 Claims, 9 Drawing Sheets

A > B

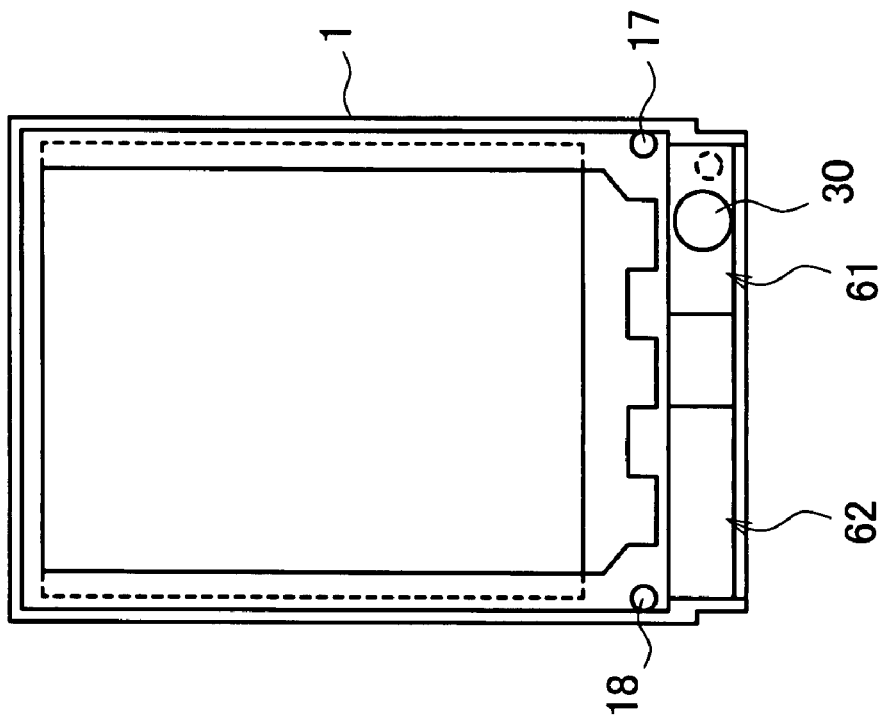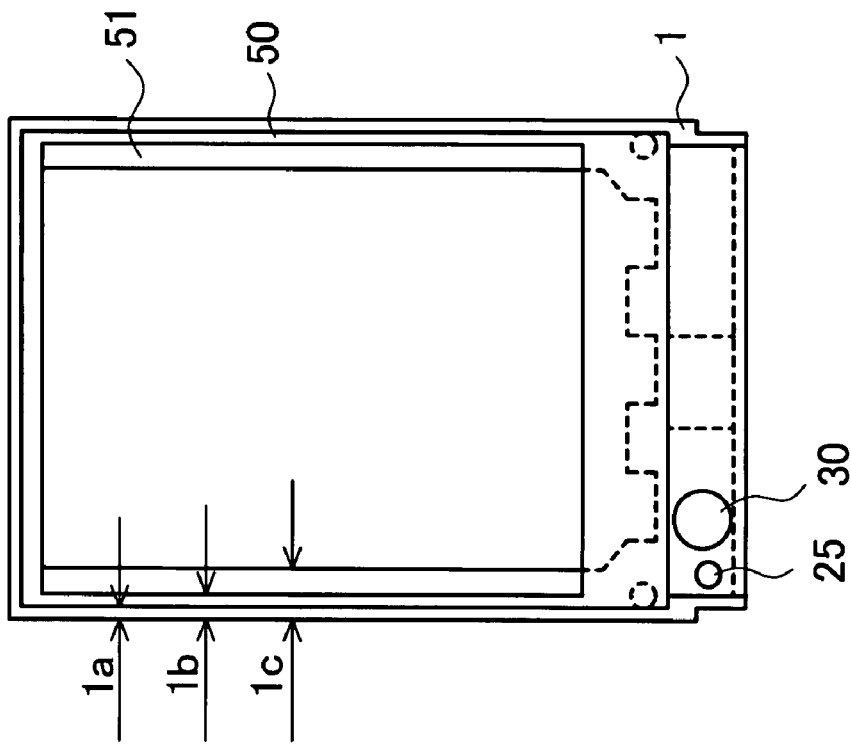

A > B

A > B

A < B

LIQUID CRYSTAL DISPLAY DEVICE

The present application claims priority from Japanese application JP2006-249009 filed on Sep. 14, 2006, the content of which is hereby incorporated by reference into this application.

BACKGROUND OF THE INVENTION

The present invention relates to a liquid crystal display device, and particularly to a technology that is effective when applied to a liquid crystal display device in which a liquid crystal display panel is mounted in a resin-molded frame.

ATFT (Thin Film Transistor) liquid crystal display module having a small-size liquid crystal display panel with approximately 240×320×3 subpixels in a color display mode is widely used as the display section of a mobile apparatus, such as a mobile phone.

The liquid crystal display module used as the display section of a mobile apparatus, such as a mobile phone, includes a liquid crystal display panel and a resin-molded frame that houses the liquid crystal display panel, and the liquid crystal display panel is housed in a recess provided in the resin-molded frame.

The liquid crystal display panel includes a first substrate, a second substrate, and a liquid crystal layer sandwiched between the first and second substrates. The first and second substrates have their respective two-dimensional shapes, which are rectangles having longer sides and shorter sides. The longer side of the first substrate is longer than that of the second substrate, and the first substrate has an area that does not overlap with the second substrate (hereinafter referred to as a non-overlapping area). A semiconductor chip on which a driver circuit is mounted is implemented in the non-overlapping area of the first substrate, and one end of a flexible printed circuit board is connected to the non-overlapping area of the first substrate. Examples of the first and second substrates include a glass substrate.

JP-A-2001-42303 discloses a technology in which shaping each corner of the liquid crystal display panel to have a curvature radius (r) prevents cracking or chipping at the corners of the liquid crystal display panel.

JP-A-2004-101741 discloses a technology in which providing a chamfer at each corner of the single-plate portion of the liquid crystal display panel reduces variation in thickness of the single-plate portion due to polishing.

Related art documents relevant to the invention include:
[Patent Document 1] JP-A-2001-42303
[Patent Document 2] JP-A-2004-101741

SUMMARY OF THE INVENTION

As described above, the liquid crystal display module for a mobile phone is configured in such a way that the liquid crystal display panel is housed in a recess of the resin-molded frame. In the liquid crystal display module having such a configuration, when the liquid crystal display panel is mounted in the recess of the resin-molded frame, there is concern that misalignment between the recess of the resin-molded frame and the liquid crystal display panel results in a problem, such as cracking and chipping, at the corners of the liquid crystal display panel. Such problems frequently occur particularly when glass substrates are used as the two substrates (first and second substrates) that form the liquid crystal display panel. Since the first substrate of the liquid crystal display panel has the non-overlapping area, such problems frequently occur at the corners of the non-overlapping area of the first substrate.

To prevent the problems, such as cracking and chipping, that occur at the corners of the liquid crystal display panel due to the misalignment between the liquid crystal display panel and the recess of the resin-molded frame when the liquid crystal display panel is mounted in the recess of the resin-molded frame, a clearance is provided at each of the corners of the recess of the resin-molded frame (corners corresponding to the corners of the liquid crystal display panel).

On the other hand, there is a need to reduce the thickness of the liquid crystal display module for a mobile phone. To reduce the thickness of the liquid crystal display module, it is necessary to reduce the thickness of the two substrates that form the liquid crystal display panel. A glass substrate with a thickness of approximately 0.5 to 0.4 mm is presently used as each of the two substrates. To further reduce the thickness of the liquid crystal display module, it is necessary to use a glass substrate with a thickness of 0.3 mm or thinner.

However, as described above, the presently used glass substrate with a thickness of 0.5 to 0.4 mm also has the problems, such as cracking and chipping, at corners of the liquid crystal display panel due to misalignment between the liquid crystal display panel and the recess of the resin-molded frame when the liquid crystal display panel is mounted in the recess of the resin-molded frame, even though a clearance is provided at each corner of the resin-molded frame. In such circumstances, use of a glass substrate with a thickness of 0.3 mm or thinner reduces the mechanical strength of the substrate itself, so that there is concern over an increase in the risk of occurrence of the problems, such as cracking and chipping, at the corners of the liquid crystal display panel. Such an increase leads to a reduced manufacturing yield of the liquid crystal display module.

The invention has been made to solve the problems of the related art, and the advantage of the invention is the ability to provide a technology by which the manufacturing yield of a liquid crystal display device can be increased.

These and other advantages and novel features of the invention will be apparent from the description in the specification and the accompanying drawings.

Representative aspects of the invention disclosed herein will be described as follows:

(1) A liquid crystal display device includes a liquid crystal display panel and a resin-molded frame that houses the liquid crystal display panel, the liquid crystal display panel including a first substrate, a second substrate, and a liquid crystal layer sandwiched between the first and second substrates, the two-dimensional shapes of the first and second substrates being rectangles having longer sides and shorter sides, the longer side of the first substrate being longer than the longer side of the second substrate, the first substrate having a non-overlapping area that does not overlap with the second substrate, and among the four corners of the first substrate, the non-overlapping area of the first substrate having two corners adjacent to each other. At least one of the two corners forms a chamfered structure having a diagonal side that intersects the longer and shorter sides of the first substrate with the diagonal side inclined to the longer and shorter sides. At the corner of the chamfered structure, by drawing imaginary extensions of the longer and shorter sides of the first substrate and letting S be the intersection of the extended longer and shorter sides, P1 be the intersection of the shorter side and the diagonal side, P2 be the intersection of the longer side and the diagonal side, A be the distance from the point P1 to the point S, and B be the distance from the point P2 to the point S, the relationship A>B is satisfied.

(2) In the description (1), the liquid crystal display panel has a plurality of subpixels, each of the plurality of subpixels having a pixel electrode and a counter electrode formed on the first substrate, and a conductive resin is applied onto the non-overlapping area of the first substrate.

(3) A liquid crystal display device includes a liquid crystal display panel and a resin-molded frame that houses the liquid crystal display panel, the liquid crystal display panel including a first substrate, a second substrate, and a liquid crystal layer sandwiched between the first and second substrates, the two-dimensional shapes of the first and second substrates being rectangles having longer sides and shorter sides, the longer side of the first substrate being longer than the longer side of the second substrate, the first substrate having a non-overlapping area that does not overlap with the second substrate, and among the four corners of the first substrate, the non-overlapping area of the first substrate having two corners adjacent to each other. At least one of the two corners forms a chamfered structure having a diagonal side that intersects the longer and shorter sides of the first substrate with the diagonal side inclined to the longer and shorter sides. At the corner of the chamfered structure, by drawing imaginary extensions of the longer and shorter sides of the first substrate and letting S be the intersection of the extended longer and shorter sides, P1 be the intersection of the shorter side and the diagonal side, P2 be the intersection of the longer side and the diagonal side, A be the distance from the point P1 to the point S, and B be the distance from the point P2 to the point S, the relationship A<B is satisfied.

(4) In the description (3), one end of a flexible printed circuit board is connected to the non-overlapping area of the first substrate.

(5) In any one of the descriptions (1) to (4), a semiconductor chip on which a driver circuit is mounted is implemented in the non-overlapping area of the first substrate.

(6) In any one of the descriptions (1) to (5), the resin-molded frame has a recess (stepped portion) that houses the liquid crystal display panel, and the liquid crystal display panel is housed in the recess of the resin-molded frame.

An effect obtained by representative aspects of the invention disclosed herein is briefly described as follows:

The invention allows improvement in the manufacturing yield of the liquid crystal display device.

BRIEF DESCRIPTION OF THE DRAWINGS

FIGS. 5A and 5B explain the shape of a resin-molded frame shown in FIGS. 1A and 1B (FIG. 5A is a top view and FIG. 5B is a bottom view);

DESCRIPTION OF THE PREFERRED EMBODIMENTS

Embodiments of the invention will be described in detail below with reference to the drawings. Throughout the drawings for describing the embodiments of the invention, portions having the same functions have the same characters and redundant description thereof will be omitted.

The liquid crystal display module according to each of the embodiments of the invention is a TFT liquid crystal display module having a small-size liquid crystal display panel with approximately 240×320×3 subpixels in a color display mode and used as the display section of a mobile apparatus, such as a mobile phone.

The liquid crystal display module according to each of the embodiments generally includes a backlight, the liquid crystal display panel disposed above the backlight, and a resin-molded frame that houses the liquid crystal display panel.

First Embodiment

Figure 1B:
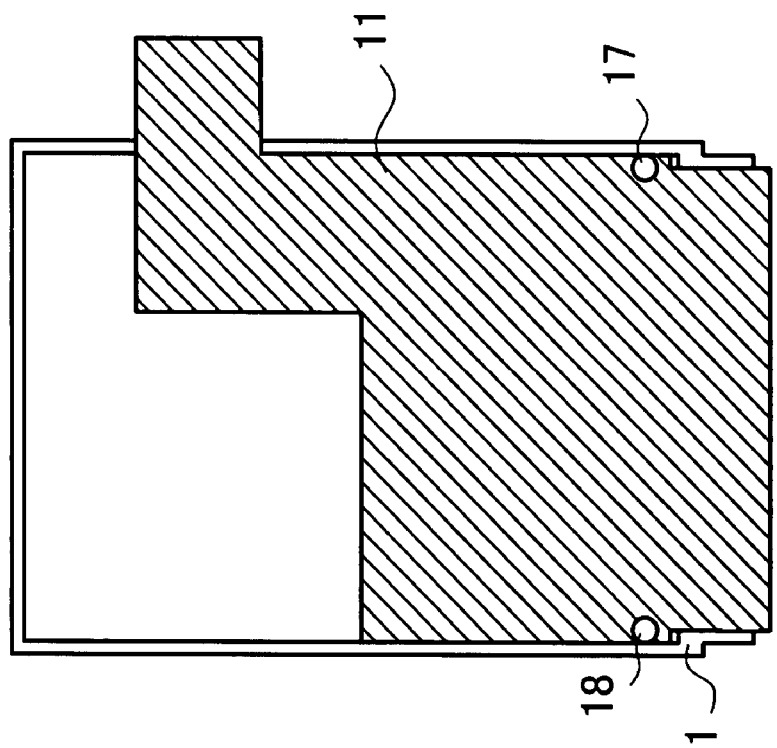
FIGS. 1A and 1B show a schematic configuration of a liquid crystal display module, which is a first embodiment of the invention (FIG. 1A is a top view and FIG. 1B is a bottom view)
Figure 1A:
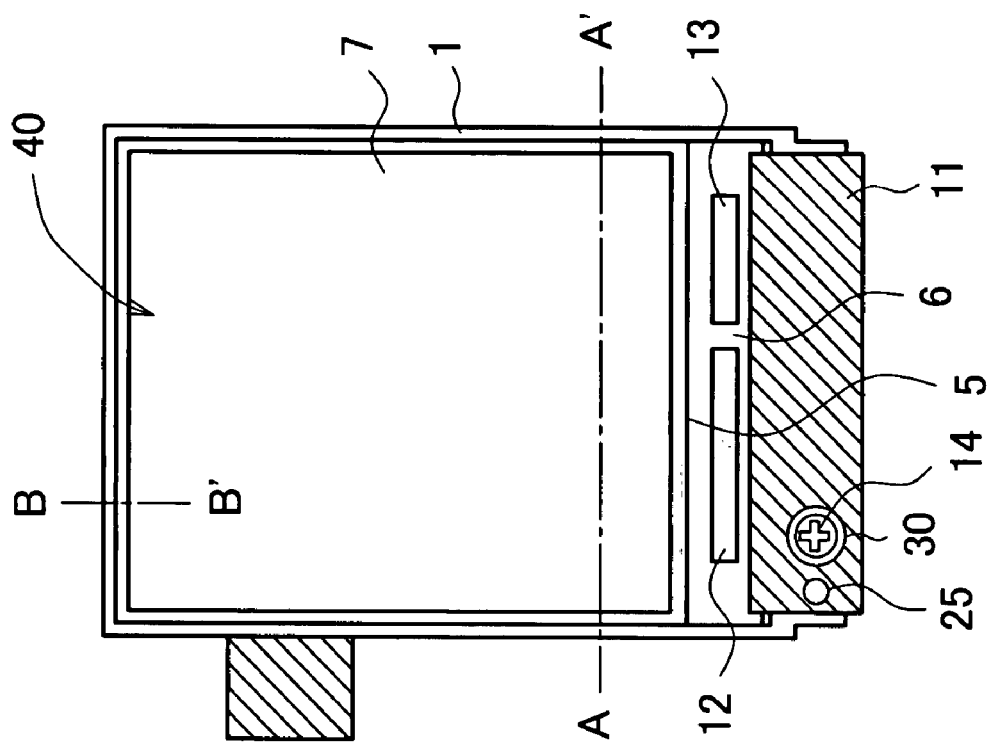

FIGS. 1A and 1B show a liquid crystal display module, which is a first embodiment of the invention. FIG. 1A is a top view (viewed from the liquid crystal display panel side, the front side or the observer side), and FIG. 1B is a bottom view (viewed from the light guide plate side, the rear side or the back side).

Figure 2:
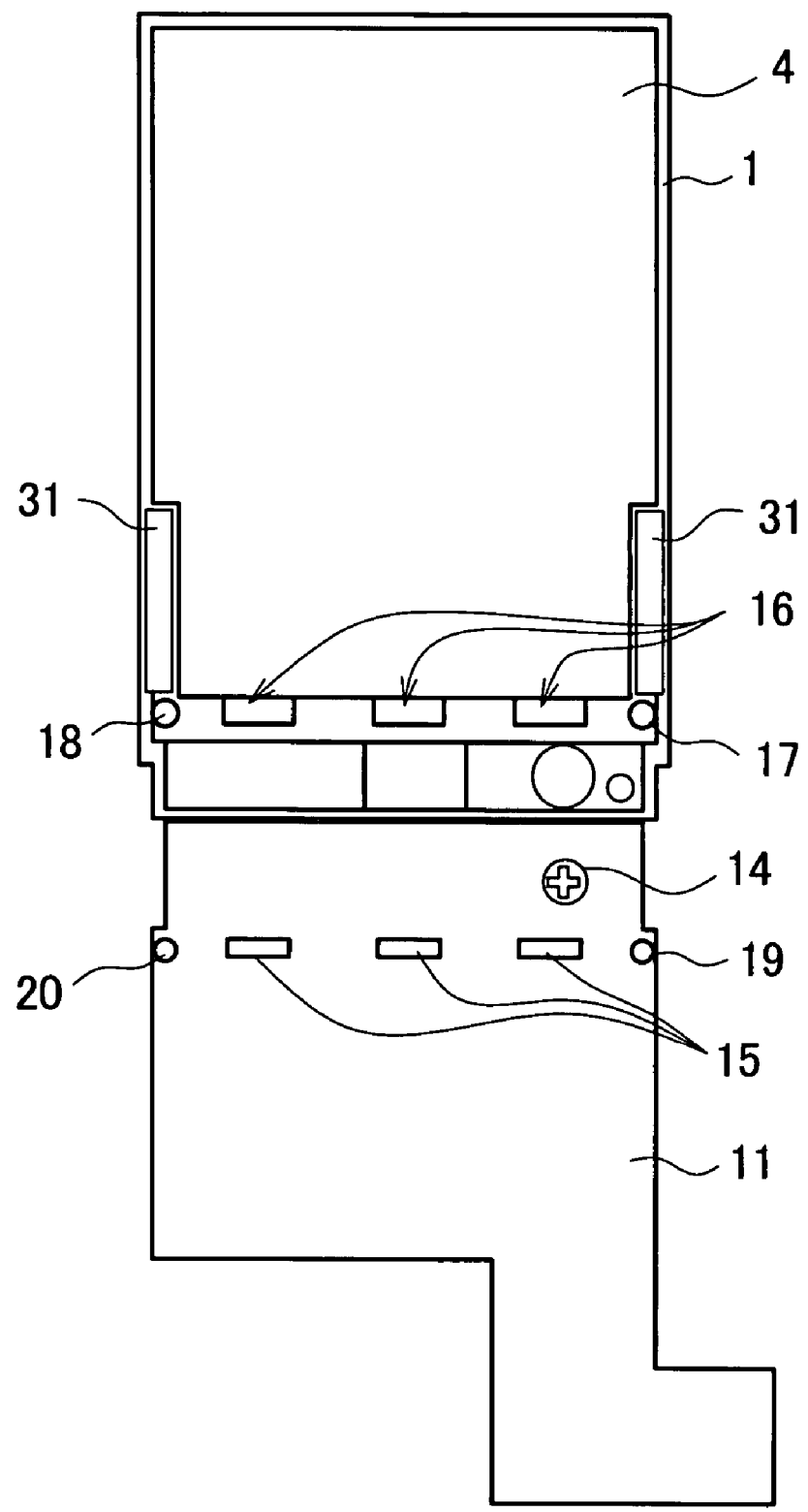
FIG. 2 shows the liquid crystal display module in FIG. 1B with a flexible printed circuit board unfolded.

FIG. 2 shows the liquid crystal display module in FIG. 1B with a flexible printed circuit board (FPC) 11 unfolded.

Reference numerals in these figures denote the following portions. Reference numeral 1 denotes a resin-molded frame (resin-molded body). Reference numeral 4 denotes a reflective sheet. Reference numerals 5 and 6 denote glass substrates. Reference numeral 7 denotes an upper polarizer. Reference numeral 11 denotes a flexible printed circuit board (FPC). Reference numerals 12 and 13 denote semiconductor chips on which driver circuits are mounted. Reference numeral 14 denotes a pre-set resistance element for adjusting Vcom. Reference numeral 15 denotes a white light emitting diode (light source). Reference numeral 16 denotes a recess that houses the white light emitting diode 15. Reference numerals 17, 18 and 25 denote protrusions. Reference numerals 19, 20 and 30 denote through holes. Reference numeral 31 denotes a double-sided adhesive tape (adherent member). Reference numeral 40 denotes a liquid crystal display panel.

The liquid crystal display panel 40 is formed by overlying the glass substrate (also referred to as a TFT substrate) 6 provided with pixel electrodes, thin film transistors and the like on the glass substrate (also referred to as a counter substrate) 5 on which a color filter and the like are formed with a predetermined gap therebetween, bonding the two substrates with a seal material provided around a frame-like area close to the peripheries of the two substrates, injecting liquid crystal material from a liquid crystal material injection port provided at part of the seal material inside the seal material between the two substrates, encapsulating the liquid crystal material, and attaching polarizers (7 and 8 (see FIG. 3)) on the outer surfaces of the two substrates. That is, the liquid crystal display panel 40 is configured in such a way that the liquid crystal layer is sandwiched between the glass substrates 5 and 6 (between a pair of substrates).

The material of the substrates is not limited to glass but may be any other materials as long as they are insulating, such as plastics. The color filter may be provided on the TFT substrate side instead of the counter substrate side. In monochromatic display devices, no color filter is required. In field sequential liquid crystal display devices, no color filter is provided and the white light emitting diodes may be replaced with light sources providing three colors.

In a TN or VA liquid crystal display panel, counter electrodes are provided on the counter substrate side. In an IPS liquid crystal display panel, counter electrodes are provided on the TFT substrate side.

Since the invention does not relate to the internal structure of the liquid crystal display panel, detailed description of the internal structure of the liquid crystal display panel will be omitted. The invention is applicable to liquid crystal display panels having any structures.

Figure 3:
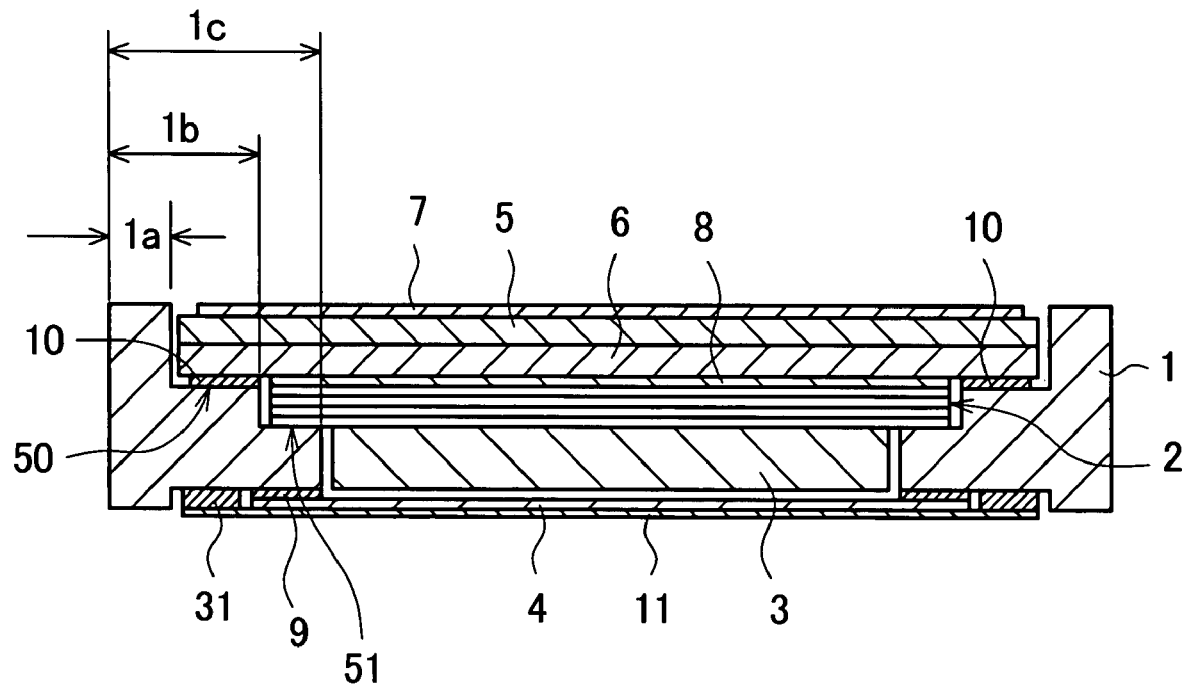
FIG. 3 is a cross-sectional view showing the cross-sectional structure taken along the line A-A' in FIG. 1A.
Figure 4:
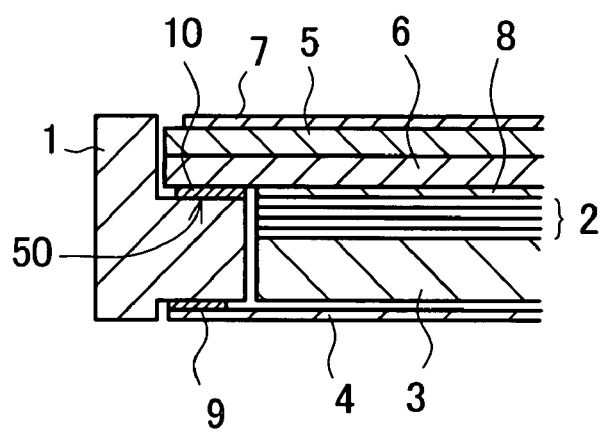
FIG. 4 is a cross-sectional view showing the cross-sectional structure taken along the line B-B' in FIG. 1A.

FIG. 3 is a cross-sectional view showing the cross-sectional structure taken along the cutting line A-A' in FIG. 1A. FIG. 4 is a cross-sectional view showing the cross-sectional structure taken along the cutting line B-B' in FIG. 1A.

In these figures, reference numeral 2 denotes a group of optical sheets (a lower diffuser sheet, two lens sheets, and an upper diffuser sheet) and reference numeral 3 denotes a light guide plate.

The backlight according to this embodiment includes the group of optical sheets 2 formed of the lower diffuser sheet, the two lens sheets and the upper diffuser sheet, the light guide plate 3, the reflective sheet 4 disposed under the light guide plate 3, and white light emitting diodes 15 disposed in a side of the light guide plate 3.

The group of optical sheets 2 is not limited to the four-sheet configuration, like the one according to this embodiment. For example, two diffuser sheets may be replaced with one diffuser sheet. Two lens sheets (prism sheets) may also be replaced with one lens sheet. Alternatively, by forming grooves in the light guide plate 3 and having the light guide plate 3 function also as a lens sheet, the lens sheet can be eliminated. The group of optical sheets 2 may therefore be a single optical sheet. Optical sheets other than the diffuser sheet and the lens sheet may be used. In summary, the group of optical sheets 2 may be replaced with at least one optical sheet.

The white light emitting diodes 15 are mounted on the flexible printed circuit board 11 and disposed in the recesses 16 formed in a side of the light guide plate 3. The reflective sheet 4 is bonded (or adheres) and secured to the resin-molded frame 1 with double-sided adhesive tapes (adherent members) 9.

FIGS. 5A and 5B explain the shape of the resin-molded frame shown in FIGS. 1A and 1B. FIG. 5A is a top view of the resin-molded frame shown in FIGS. 1A and 1B (viewed from the liquid crystal display panel side), and FIG. 5B is a bottom view of the resin-molded frame shown in FIGS. 1A and 1B (viewed from the light guide plate side).

As shown in FIGS. 5A and 5B, the two-dimensional shape, in the direction perpendicular to the thickness direction, of the resin-molded frame 1 is rectangular, for example, a rectangle having longer sides and shorter sides in this embodiment. The resin-molded frame 1 has a structure with the bottom removed and an aperture provided at the center, that is, a frame structure (or a tubular structure), the cross-sectional shape of which is substantially rectangular.

As shown in FIGS. 3, 5A and 5B, the longer side of the resin-molded frame 1 has first to third portions (1*a*, 1*b* and 1*c*), and the distances from these portions to the opposite sides vary stepwise. The distance from the second portion 1*b* to the opposite side is narrower than that of the first portion 1*a*, and the distance from the third portion 1*c* to the opposite side is narrower than that of the second portion 1*b*.

The first portion 1*a* and the second portion 1*b* form a first step 50, and the second portion 1*b* and the third portion 1*c* form a second step 51.

The edges of the lower glass substrate 6 of the liquid crystal display panel 40 are supported and secured to the steps 50 of the resin-molded frame 1 with double-sided adhesive tapes (adherent members) 10. The group of optical sheets 2 is supported on the steps 51 of the resin-molded frame 1, and the light guide plate 3 is disposed inside the third portions 1*c* of the resin-molded frame 1. The reflective sheet 4 is disposed under the light guide plate 3 in such a way that the reflective sheet 4 covers the opening of the resin-molded frame 1. That is, the resin-molded frame 1 has a recess (formed of steps 50) that houses the liquid crystal display panel 40, and the liquid crystal display panel 40 is housed in the recess of the resin-molded frame 1.

Figure 6:
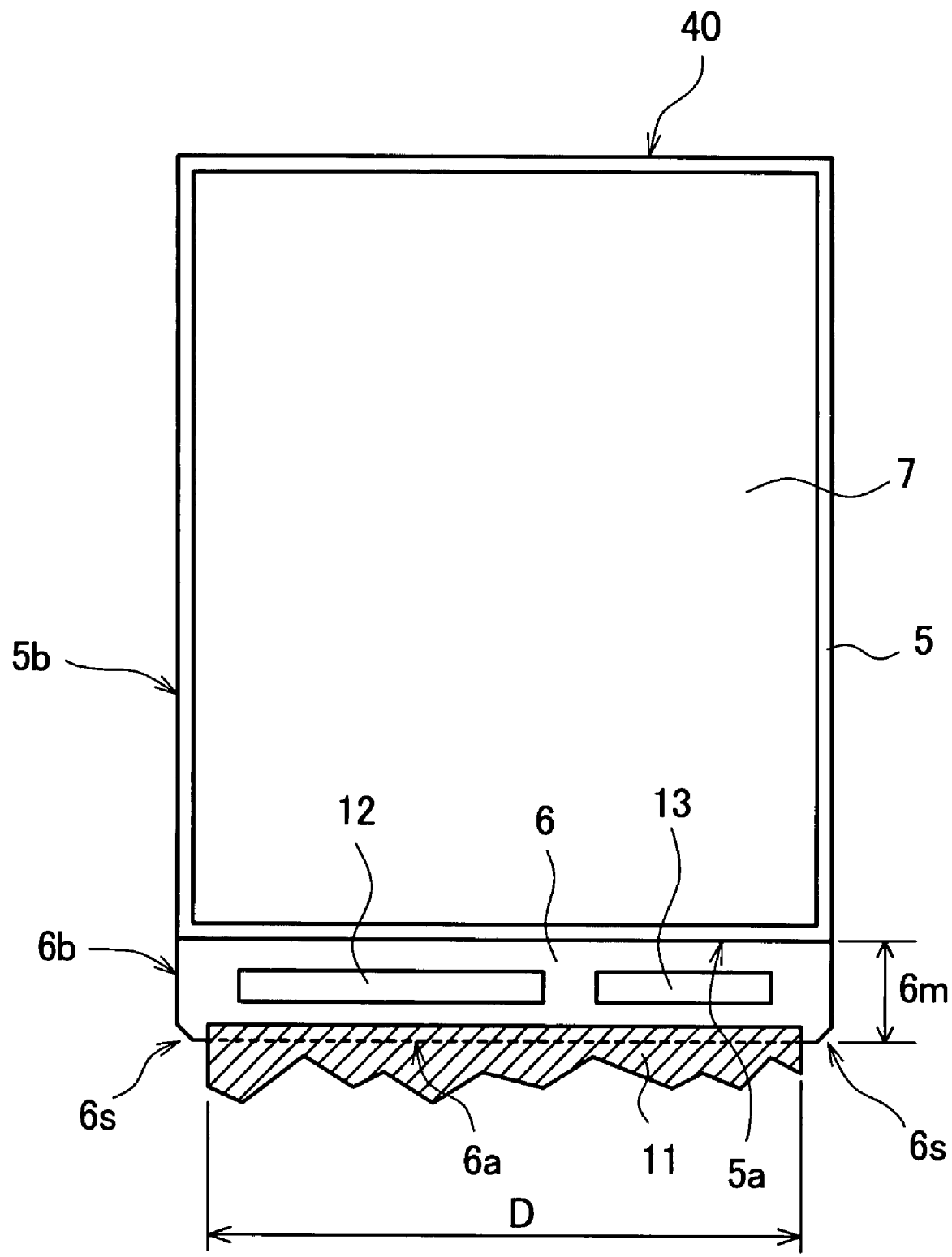
FIG. 6 explains the shape of a liquid crystal display panel shown in FIG. 1A (top view)
Figure 7:
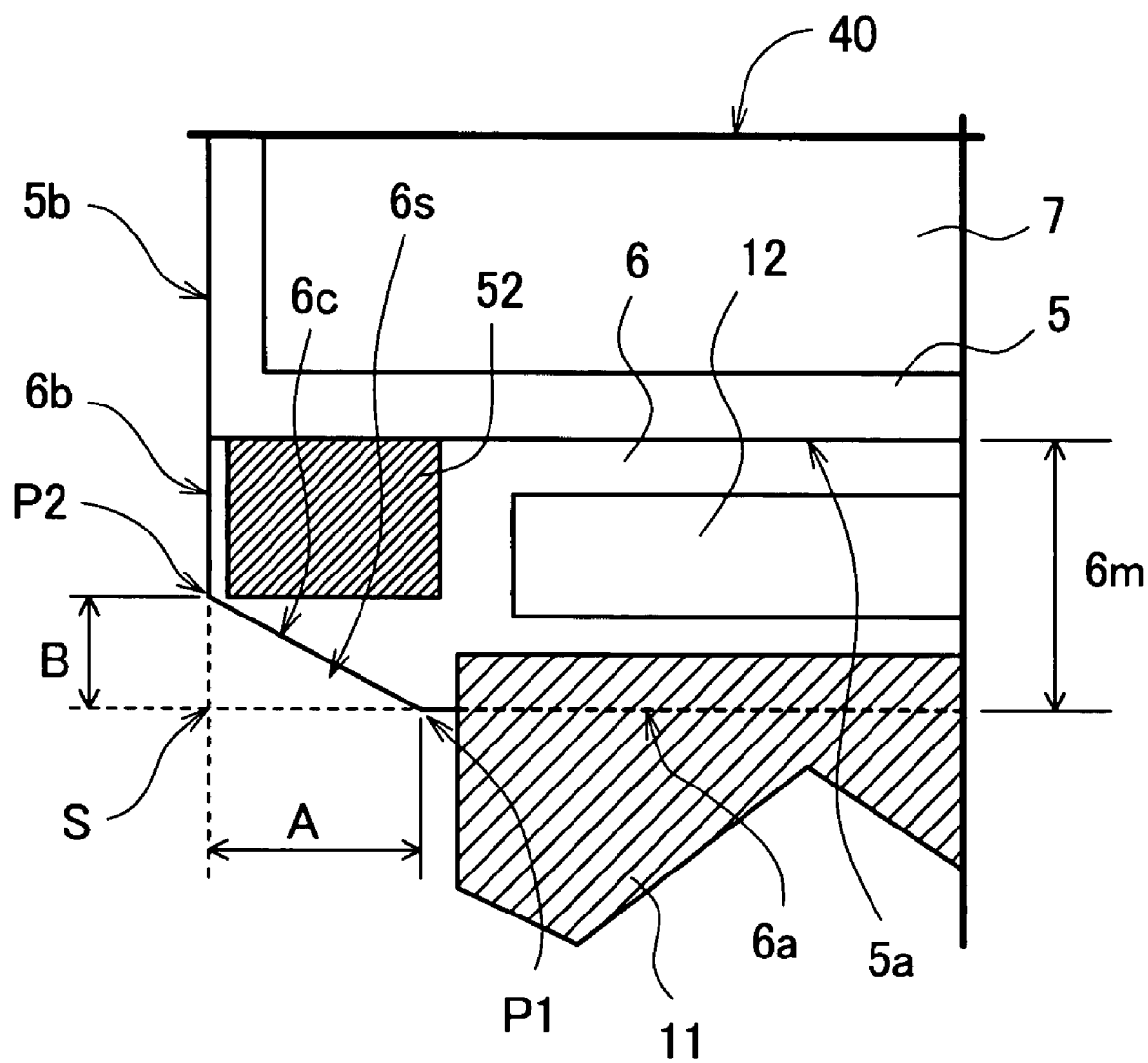
FIG. 7 is an enlarged view of part of FIG. 6.

FIG. 6 explains the shape of the liquid crystal display panel shown in FIG. 1A, and FIG. 7 is an enlarged view of part of FIG. 6.

As described above, the liquid crystal display panel 40 includes the glass substrate 6, the glass substrate 5, and the liquid crystal layer sandwiched between the glass substrates 5 and 6. The liquid crystal display panel 40 has a plurality of subpixels, and each of the plurality of subpixels has a pixel electrode and a counter electrode formed on the glass substrate 6. That is, the liquid crystal display panel 40 according to this embodiment employs the IPS system.

In the liquid crystal display panel 40, as shown in FIG. 6, the two-dimensional shapes of the glass substrates 6 and 5 are rectangles having longer sides (5*b* and 6*b*) and shorter side (5*a* and 6*a*), respectively. The longer side 6*b* of the glass substrate 6 is longer than the longer side 5*b* of the glass substrate 5, so that the glass substrate 6 has an area 6*m* that does not overlap with the glass substrate 5 (herein after referred to as a non-overlapping area). Among the four corners of the glass substrate 6, the non-overlapping area 6*m* of the glass substrate 6 has two corners 6*s* adjacent in the direction of the shorter side 6*a* of the glass substrate 6.

The semiconductor chips (12 and 13) on which driver circuits are mounted are implemented in the non-overlapping area 6*m* of the glass substrate 6. One end of the flexible printed circuit board 11 is also electrically and mechanically connected to the non-overlapping area 6*m* of the glass substrate 6. Furthermore, a conductive resin applied area 52 (see FIG. 7) for applying a conductive resin is provided in the non-overlapping area 6*m* of the glass substrate 6.

In the liquid crystal display module according to this embodiment, a protection film is attached to the upper polarizer 7. When the product is actually used, it is necessary to remove the protection film. However, removal of the protection film generates static electricity, which charges the glass substrate 5. This charge may cause abnormal display in the liquid crystal display panel.

To remove such static electricity, a transparent conductive film (ITO: Indium Tin Oxide, for example) is formed on the glass substrate 5 that forms the liquid crystal display panel 40, and the transparent conductive film is electrically connected to a predetermined terminal on the glass substrate 6 via a conductive resin. The conductive resin is applied onto the conductive resin applied area 52 shown in FIG. 7.

As shown in FIG. 7, each of the two corners in the non-overlapping area 6m of the glass substrate 6 forms a chamfered structure having a diagonal side 6c that intersects the longer side 6b and the shorter side 6a of the glass substrate 6 with the diagonal side 6c inclined to the longer side 6b and the shorter side 6a.

At the corner 6s of the chamfered structure, by drawing imaginary extensions of the longer side 6b and the shorter side 6a of the glass substrate 6 and letting S be the intersection of the extended longer side 6b and shorter side 6a, P1 be the intersection of the shorter side 6a and the diagonal side 6c, P2 be the intersection of the longer side 6b and the diagonal side 6c, A be the distance from the point P1 to the point S, and B be the distance from the point P2 to the point S, the liquid crystal display panel 40 according to this embodiment satisfies the relationship A>B.

The liquid crystal display module according to this embodiment is configured in such a way that the liquid crystal display panel 40 is housed in the recess of the resin-molded frame 1, as described above. In the liquid crystal display module having such a configuration, when the liquid crystal display panel 40 is mounted in the recess of the resin-molded frame 1, there is concern that misalignment between the recess of the resin-molded frame 1 and the liquid crystal display panel 40 may result in problems, such as cracking and chipping, at the corners of the liquid crystal display panel 40. Such problems frequently occur particularly when glass substrates are used as the two substrates that form the liquid crystal display panel 40.

Such problems frequently occur at the corners 6s of the non-overlapping area 6m of the glass substrate 6 of the liquid crystal display panel 40, because when the liquid crystal display panel 40 is mounted in the recess of the resin-molded frame 1, the overlapping area of the glass substrate 6 is aligned with the recess of the resin-molded frame 1, and then the non-overlapping area 6m of the glass substrate 6 is put down in the recess of the resin-molded frame 1.

In this embodiment, to address such problems, each of the two corners in the non-overlapping area 6m of the glass substrate 6 forms a chamfered structure having the diagonal side 6c that intersects the longer side 6b and the shorter side 6a of the glass substrate 6 with the diagonal side 6c inclined to the longer side 6b and the shorter side 6a, as shown in FIG. 7. In such a configuration, when the liquid crystal display panel 40 is mounted in the recess of the resin-molded frame 1, the risk of occurrence of the problems, such as cracking and chipping, at the corners of the liquid crystal display panel 40 (corners 6s of the non-overlapping area 6m of the glass substrate 6) due to misalignment between the liquid crystal display panel 40 and the recess of the resin-molded frame 1 can be reduced, which improves the manufacturing yield of the liquid crystal display module.

Furthermore, in this embodiment, the corners 6s of the chamfered structures (two corners in the non-overlapping area 6m of the glass substrate 6) satisfy the relationship A>B, as shown in FIG. 7. In such a configuration, when the liquid crystal display panel 40 is mounted in the recess of the resin-molded frame 1, the risk of occurrence of the problems, such as cracking and chipping, at the corners of the liquid crystal display panel 40 (corners 6s of the non-overlapping area 6m of the glass substrate 6) due to misalignment between the liquid crystal display panel 40 and the recess of the resin-molded frame 1 can be reduced, while ensuring the area of the conductive resin applied area 52 required in an IPS product, as compared to the case where the relationship A=B is satisfied.

Figure 8:
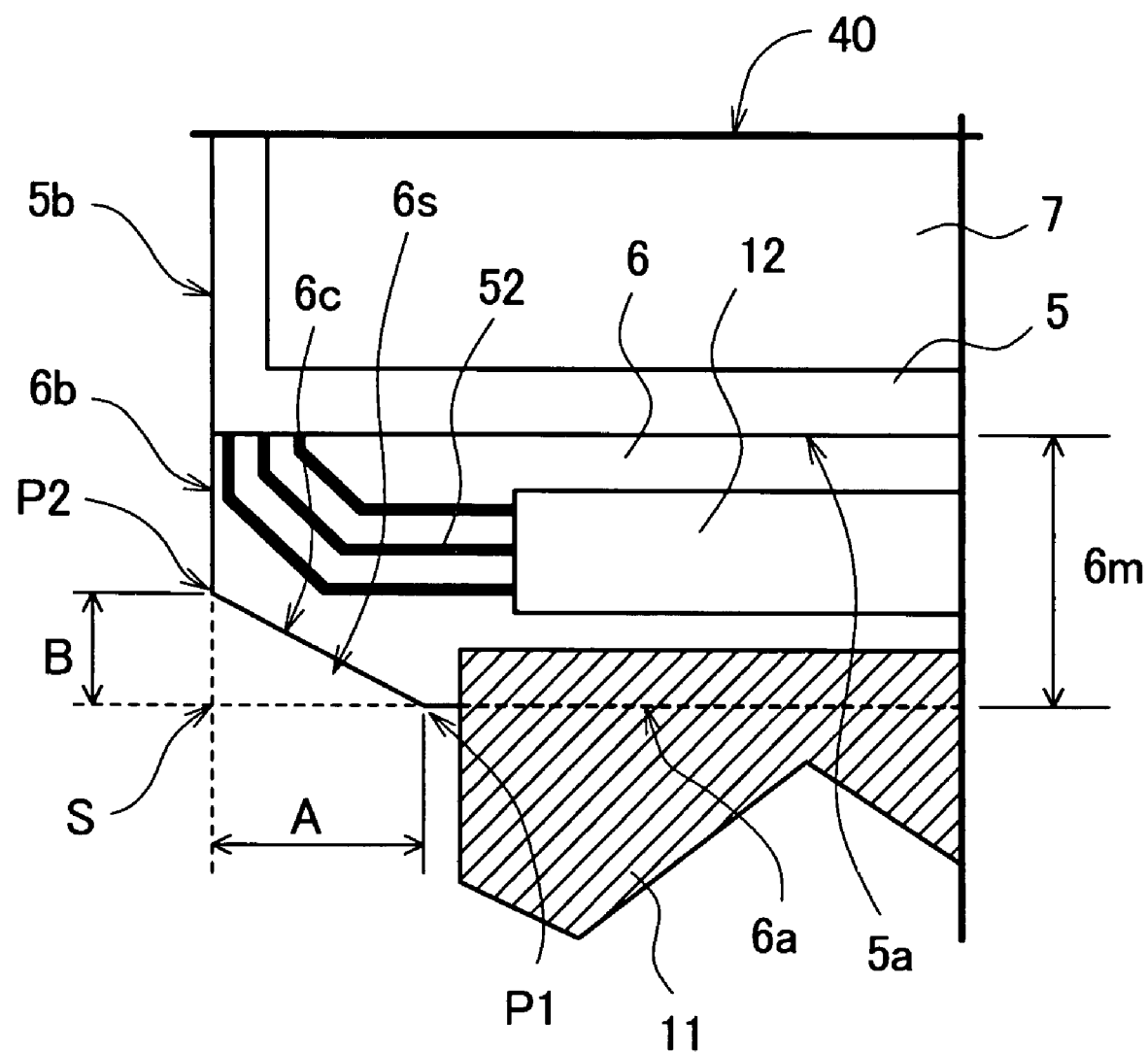
FIG. 8 shows a variation of the liquid crystal display panel shown in FIG. 7.

FIG. 8 shows a variation of the liquid crystal display panel shown in FIG. 7.

In the liquid crystal display panel 40, when the two corners in the non-overlapping area 6m of the glass substrate 6 are configured to form chamfered structures, the area necessary for routing around wiring lines 53 in the non-overlapping area 6m of the glass substrate 6 is reduced. However, by configuring the corners 6s of the chamfered structures (two corners in the non-overlapping area 6m of the glass substrate 6) to satisfy the relationship A>B as shown in FIG. 8, the impact on the effective wiring area can be minimized, as compared with the case where the relationship A=B is satisfied. This advantage is independent of whether or not the product is an IPS product and whether or not there is the conductive resin applied area 52.

Second Embodiment

Figure 9:
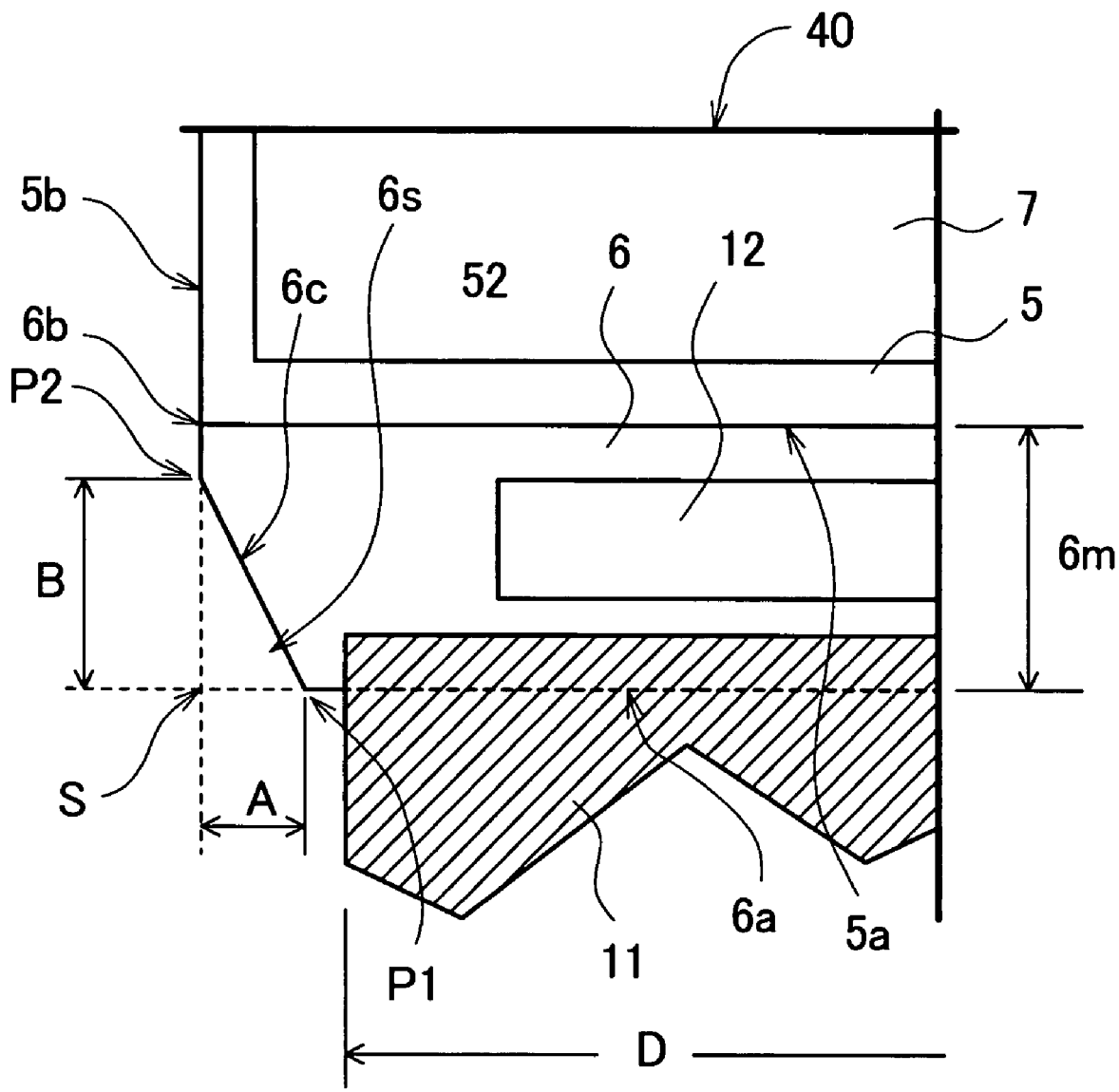
FIG. 9 shows part of a liquid crystal display panel in a liquid crystal display module, which is a second embodiment of the invention.

FIG. 9 shows part of a liquid crystal display panel in a liquid crystal display module, which is a second embodiment of the invention.

The liquid crystal display module according to the second embodiment basically has a configuration similar to that of the first embodiment described above except for the following points.

That is, in the first embodiment, as shown in FIG. 7, the corners 6s of the chamfered structures (two corners in the non-overlapping area 6m of the glass substrate 6) satisfy the relationship A>B, while in the second embodiment, as shown in FIG. 9, the corners 6s of the chamfered structures (two corners in the non-overlapping area 6m of the glass substrate 6) satisfy the relationship A<B.

In such a configuration, when the liquid crystal display panel is mounted in the recess of the resin-molded frame, the risk of occurrence of the problems, such as cracking and chipping, at the corners of the liquid crystal display panel (corners 6s of the non-overlapping area 6m of the glass substrate 6) due to misalignment between the liquid crystal display panel and the recess of the resin-molded frame can be reduced, while ensuring the width D of the flexible printed circuit board 11, as compared to the case where the relationship A=B or A>B is satisfied.

In the first and second embodiments, although the description has been made of the case where the two corners 6s in the non-overlapping area 6m of the glass substrate 6 form the chamfered structures, the invention is not limited thereto. The invention may be applied to embodiments in which at least one of the corners 6s forms a chamfered structure that satisfies the relationship A>B or A<B.

Figure 10A:
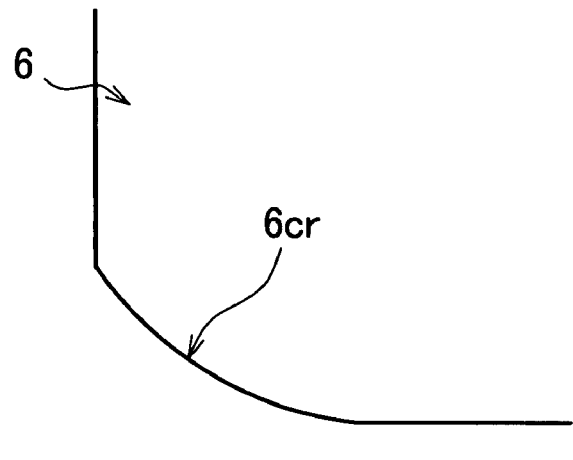
FIGS. 10A to 10C show variations of diagonal sides in the embodiments of the invention.
Figure 10B:
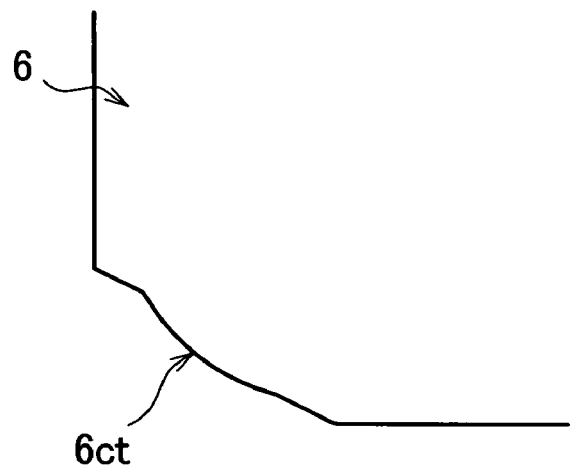
Figure 10C:
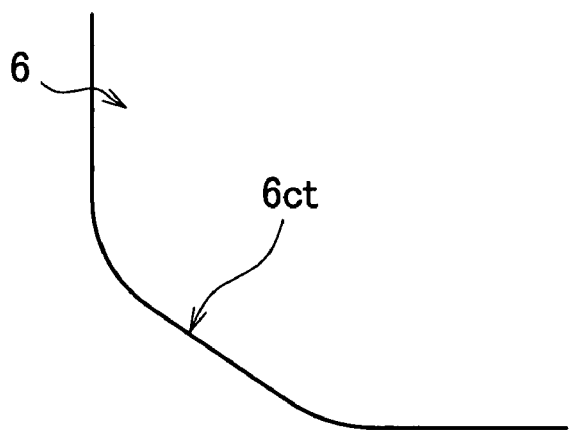

Although the above description has been made of the case where each of the corners 6s in the non-overlapping area 6m of the glass substrate 6 has the linear diagonal side 6c, the linear diagonal side 6c may be replaced with a curved diagonal side 6cr, as shown in FIG. 10A, or a linear diagonal side 6ct, part of which is curved, as shown in FIGS. 10B and 10C.

Although the invention made by the inventor has been specifically described based on the above embodiments, the invention is not limited to those embodiments, but various changes can of course be made, provided that they come within the spirit of the invention.

What is claimed is:

1. A liquid crystal display device comprising:
a liquid crystal display panel and a resin-molded frame that houses the liquid crystal display panel, the liquid crystal display panel including a first substrate, a second substrate, and a liquid crystal layer sandwiched between the first and second substrates, the first and second substrates each having a two-dimensional shape being rectangles having longer sides and shorter sides, the longer side of the first substrate being longer than the longer side of the second substrate, the first substrate having four corners and having a non-overlapping area that does not overlap with the second substrate, and among the four corners of the first substrate, the non-overlapping area of the first substrate having two corners adjacent to each other, wherein at least one of the two corners forms a chamfered structure having a diagonal side that intersects the longer and shorter sides of the first substrate with the diagonal side inclined to the longer and shorter sides, and at the corner of the chamfered structure, by drawing imaginary extensions of the longer and shorter sides of the first substrate and letting S be the intersection of the extended longer and shorter sides, P1 be the intersection of the shorter side and the diagonal side, P2 be the intersection of the longer side and the diagonal side, A be the distance from the point P1 to the point S, and B be the distance from the point P2 to the point S, the relationship $A>B$ is satisfied, and electrical lines connecting said longer side and shorter side having a clunked portion at the chamfered structure.

2. The liquid crystal display device according to claim 1, wherein the liquid crystal display panel has a plurality of subpixels, each of the plurality of subpixels has a pixel electrode and a counter electrode formed on the first substrate, and a conductive resin is applied onto the non-overlapping area of the first substrate.

3. The liquid crystal display device according to claim 1, wherein a semiconductor chip on which a driver circuit is mounted is implemented in the non-overlapping area of the first substrate.

4. The liquid crystal display device according to claim 1, wherein the resin-molded frame has a recess that houses the liquid crystal display panel, and the liquid crystal display panel is housed in the recess of the resin-molded frame.

5. A liquid crystal display device comprising:

a liquid crystal display panel and a resin-molded frame that houses the liquid crystal display panel, the liquid crystal display panel including a first substrate, a second substrate, and a liquid crystal layer sandwiched between the first and second substrates, the first and second substrates each having a two-dimensional shape being rectangles having longer sides and shorter sides, the longer side of the first substrate being longer than the longer side of the second substrate, the first substrate having four corners and having a non-overlapping area that does not overlap with the second substrate, and among the four corners of the first substrate, the non-overlapping area of the first substrate having two corners adjacent to each other, wherein at least one of the two corners forms a chamfered structure having a diagonal side that intersects the longer and shorter sides of the first substrate with the diagonal side inclined to the longer and shorter sides, and at the corner of the chamfered structure, by drawing imaginary extensions of the longer and shorter sides of the first substrate and letting S be the intersection of the extended longer and shorter sides, P1 be the intersection of the shorter side and the diagonal side, P2 be the intersection of the longer side and the diagonal side, A be the distance from the point P1 to the point S, and B be the distance from the point P2 to the point S, the relationship $A<B$ is satisfied, and electrical lines connecting said longer side and shorter side having a clunked portion at the chamfered structure.

6. The liquid crystal display device according to claim 5, wherein one end of a flexible printed circuit board is connected to the non-overlapping area of the first substrate.

7. The liquid crystal display device according to claim 5, wherein a semiconductor chip on which a driver circuit is mounted is implemented in the non-overlapping area of the first substrate.

8. The liquid crystal display device according to claim 5, wherein the resin-molded frame has a recess that houses the liquid crystal display panel, and the liquid crystal display panel is housed in the recess of the resin-molded frame.

* * * * *